L. BAUMGARTL.
AUTOMOBILE BUMPER.
APPLICATION FILED FEB. 3, 1921.

1,374,978.

Patented Apr. 19, 1921.
2 SHEETS—SHEET 1.

Inventor
Leroy Baumgartl
By:
Attys.

L. BAUMGARTL.
AUTOMOBILE BUMPER.
APPLICATION FILED FEB. 3, 1921.
1,374,978.
Patented Apr. 19, 1921.
2 SHEETS—SHEET 2.
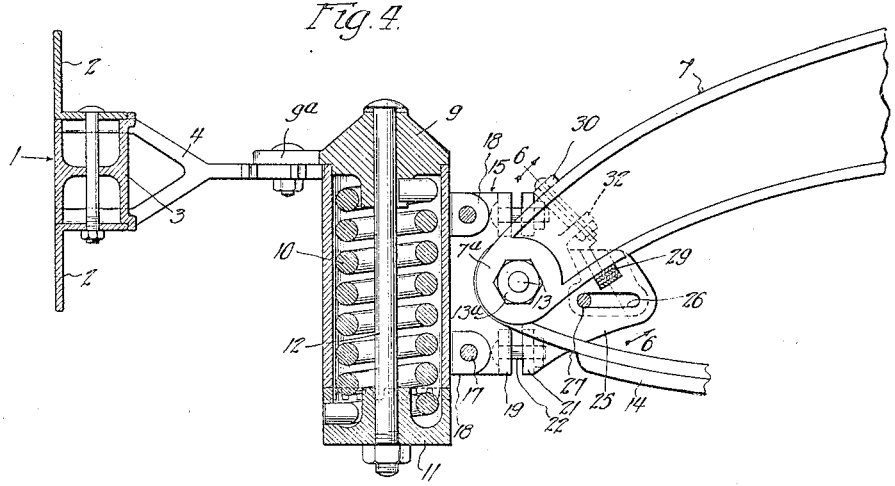
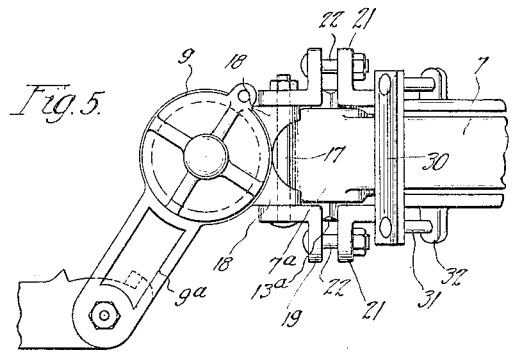
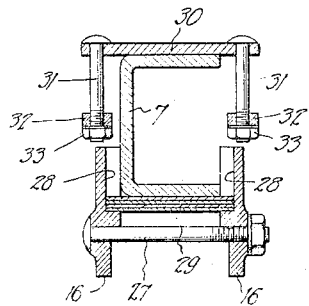
Inventor
Leroy Baumgartl

UNITED STATES PATENT OFFICE.

LEROY BAUMGARTL, OF CHICAGO, ILLINOIS.

AUTOMOBILE-BUMPER.

1,374,978.　　　　　Specification of Letters Patent.　　Patented Apr. 19, 1921.

Application filed February 3, 1921. Serial No. 442,045.

*To all whom it may concern:*

Be it known that I, LEROY BAUMGARTL, a citizen of the United States, and a resident of Chicago, in the county of Cook and State of Illinois, have invented certain new and useful Improvements in Automobile-Bumpers, of which the following is a specification.

This invention relates to improvements in automobile bumpers and more particularly to means for attaching or mounting the bumper upon the ends of the frame members of a motor vehicle.

The type of bumper embodying the invention comprises an impact bar supported at two points intermediate its ends by means of rotative arms and intermediate links forming a part of a shock absorbing device, involving the principle of a torsion spring inclosed within vertically disposed cylinders located intermediate the impact bar and the end of the vehicle frame members. The general features of construction of such a bumper are fully described and illustrated in a patent granted to me on July 13th, 1920, and bearing number 1,346,478.

For mounting the cylinders upon the ends of the frame members an arrangement of connected plates, forming a housing substantially surrounding the ends of the frame members is employed. The objects of the invention include among others, a construction permitting sufficient adjustability in all directions in order that the parts may be fitted to various makes of motor vehicle differing in the dimensions at the ends of the frame members to which the bumper is to be attached. It is to be understood, therefore, that the present invention is directed more especially to a new and useful means for mounting a bumper of the character described upon a motor vehicle, although such means is equally well adapted for the mounting of all types of bumpers either by directly connecting the impact member to the bracket or indirectly by means of an intermediate supporting or shock absorbing member.

A preferable construction of the bumper is illustrated on the accompanying drawings wherein—

Figure 1:
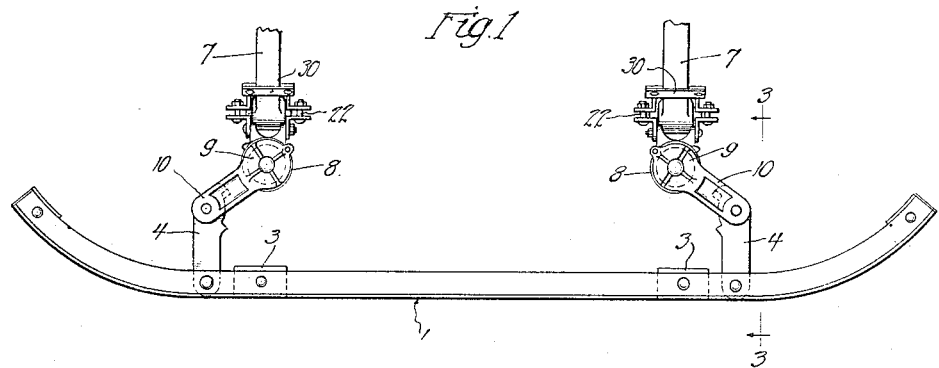
Figure 2:
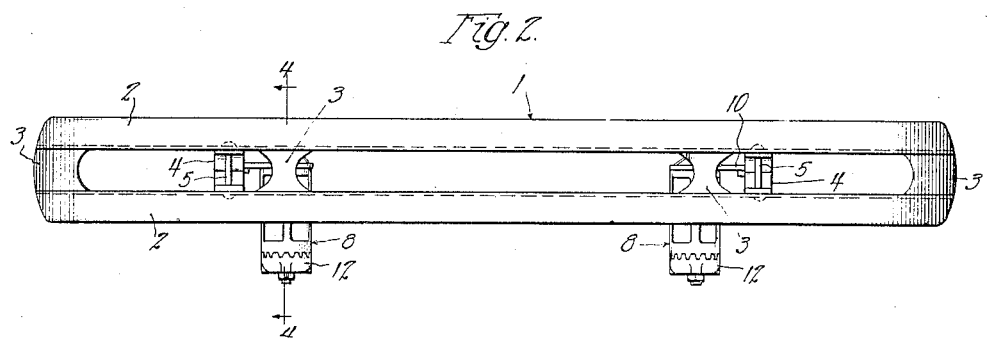
Figure 3:
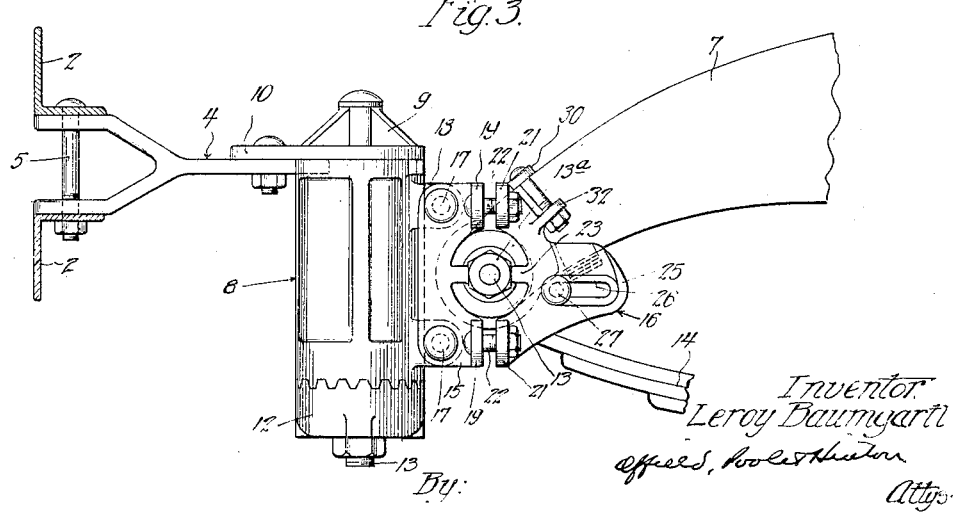

Figure 1 is a top plan view of the bumper attached to the frame members of a vehicle, Fig. 2 is a view in front elevation of the bumper, Fig. 3 is an enlarged detailed view taken on line 3, 3 of Fig. 1, and showing the shock absorbing device and attaching bracket in side elevation, Fig. 4 is a view similar to Fig. 3, taken on line 4, 4 of Fig. 2, and showing the same parts in vertical section, Fig. 5 is an enlarged top plan view of the forward end of a vehicle frame member with the parts attached thereto, and Fig. 6 is a detailed view in vertical section, taken on line 6, 6 of Fig. 4.

As hereinabove suggested, the bumper comprises in general an impact bar 1 preferably comprising two vertically spaced bars 2, 2 of L-section extending throughout the length of the bar and curved rearwardly throughout their end portions. These bars are joined together at their ends and at suitable points intermediate their ends, by means of spacing members 3. At points disposed inwardly from the ends of the bar 1 are attached links 4, 4 having pivotal connection with the impact bar through the medium of a forked extremity and a bolt 5 extending through the horizontal webs of the L-bars 2, 2 and the forked extremity of said link 4, as clearly shown in Fig. 3. Immediately beyond the ends of the frame members 7, 7 of the vehicle are located vertically disposed cylinders 8, 8 provided at their upper ends with rotative caps 9, 9, each cap being provided with an integral arm $9^a$ extending in a forwardly and outwardly direction and having pivotal connection with the opposite ends of the links 4, 4. As clearly shown in Fig. 4, each of the cylinders 8, 8 is hollow, thus providing a housing within which is mounted a coil or torsion spring 10 having its upper end fixed to the cap 9 and its lower end similarly fixed to a rotatively adjustable cap 11 at the lower end of the cylinder. The caps 9 and 11 are mounted upon an axially arranged bolt 12, the lower cap engaging the lower edge of the cylinder housing through the medium of interfitting teeth whereby the lower cap may be rotated relative to the cylinder housing, thereby increasing or decreasing the torsion of the spring 10. The adjustment of the lower cap 11 is manifestly accomplished by loosening the bolt 12.

Without going into further detail as to the construction of the impact bar and the cylinders 8, 8, it is to be observed that blows directed against the impact bar are transmitted to the torsion springs 12, 12 through the medium of the links 4, 4 and the arms 9ª, 9ª forming a part of the rotative caps 9, 9, the latter being rotated in a direction to increase the torsion of the springs whereby the force of the blow is gradually absorbed without transmitting the force of the blow to the frame of the vehicle.

Referring now to the attaching bracket or means whereby the cylinders 8, 8 are mounted upon the ends of the frame members 7, 7, it is to be observed that these frame members are the ordinary channel-shaped members, extending longitudinally of the vehicle and terminating in downwardly curved end portions provided with a cylindric shaped head 7ª at the very extremities, these heads being somewhat wider than the frame members and supporting a pivot bolt 13 whereby the forward end of the vehicle springs 14 is connected to the frame member. While it may be stated that the construction described is standard in nearly all makes of motor vehicles, the dimensions of the frame members as well as of the heads are seldom the same, and hence the desirability of providing an attaching bracket having sufficient degree of adjustability in all directions to enable such a bracket to be fitted to a large number of makes of motor vehicles.

In order to incorporate the features of adjustability and other advantageous features, the following construction is proposed as a desirable bracket or attaching member for bumpers. In general, the bracket may be said to comprise two pairs of companion plates located on opposite sides of the frame members, the corresponding pairs being connected together by means of bolts, thus clamping the end of the frame members between the pairs of plates. Furthermore, the plates of each pair are bolted or adjustably connected together in order to permit the assembly of the plates in clamping position and to afford the desired degree of longitudinal adjustability.

Considering each pair of companion plates separately, the same comprise what may be termed a forward plate 15 and a rear plate 16. The forward plate 15 is a vertically disposed member adapted to be fixed to the cylinder 8 by means of bolts 17, 17 which extend through the outer portion of said plate 15 and a pair of lugs 18 formed integral with the cylinder 8 and arranged one above the other in vertical alinement. These bolts 17 likewise extend through the other companion plate 15 and a corresponding pair of lugs 18, 18 on the opposite side of the frame member 7, as clearly shown in Fig. 5. At the free edge of the plate 15 and adjacent the upper and lower ends thereof are formed outwardly and laterally projecting ears 19, 19. Intermediate the ears 19, 19 the vertical edge of the plate 15 is concave or of semi-circular conformation 15ª, there being formed at the center of said semi-circular portion a rearwardly projecting lug 20.

The rear plate 16 forms in effect a continuation of the plate 15, although separable therefrom, the same being provided with a pair of ears 21, 21 corresponding to the ears 19, 19 of the plate 15 and connected thereto by means of horizontal bolts 22, 22. The forward edge of the plate 16 is also provided with a semi-circular portion 16ª forming the complement of the portion of like contour of the plate 15 and so also is provided with a forwardly projecting lug 23, this lug being in horizontal alinement with the corresponding lug 20 of the plate 15.

At this point may be brought out the manner in which the pairs of plates 15 and 16 are positioned with respect to the frame members and parts thereof. It is to be observed first that the forward plate 15 is positioned for the most part in front of the frame head 7ª and that its rear edge, as defined by the vertically disposed ears 19, 19 substantially coincides with a vertical line drawn through the axis of the pivot bolt 13, although in practice the ears 19, 19 would be offset forwardly a short distance from this imaginary line. Similarly, the rear plate 16 occupies a corresponding position on the opposite side of this imaginary line drawn through the axis of the pivot bolt 13, and similarly is offset slightly rearwardly of said line. The plates being thus related may be said to center about the axis of the pivot bolt so that the corresponding and opposed semi-circular portions surround the pivot bolt as a center. Furthermore, the lugs 20 and 23 of the plates 15 and 16 respectively, extend radially toward the axis of said pivot bolt and terminate in abutting engagement with a nut 13ª such as ordinarily surmounts the ends of a pivot bolt. In practice, it is desirable that the ends of the lugs abut against the opposite faces of the pivot bolt nut 13ª and at the same time space the plates apart longitudinally so that the corresponding pairs of ears 19 and 21 will not be brought into contact when the plates are drawn together by the tightening of the plates 22, 22. In other words, the purpose of the lugs 23, 23 is to provide longitudinally alined points of contact between the plates and the pivot bolt. Thus the forces transmitted to the plates from the cylinder 8 will in turn be transmitted to the frame member indirectly through the pivot bolt rather than directly by reason of any immediate contact between the plates and the frame members. It is to be understood that the corresponding or companion plates on the opposite side of the frame member are constructed in the same manner and engage the opposite end of the pivot bolt. Thus, these pairs of plates form in effect a housing which completely surrounds the end or head of the frame member and by reason of the bolts connecting the corresponding pairs of plates as well as the plates of each pair, provision is made for lateral adjustment as well as longitudinal adjustment, thus enabling the plates to be fitted and securely fastened to several different frame members of substantially the same design although varying in dimensions within reasonable limits.

In addition to the features already disclosed with respect to the plates 15 and 16, and constituting one pair of the complete bracket, further means of attachment and adjustment are provided which are associated directly with the rear plate 16 of each pair of companion plates. As clearly shown in Figs. 3 and 4, the rear plate is extended rearwardly throughout its lower portion, there being formed in this extended portion 25 an elongated slot 26 so positioned as to clear the under side of the frame member 7. Bearing in mind that there is a corresponding slot in the companion plate 16, a bolt 27 passes through the slots and beneath the frame member 7, thus serving to further clamp the plates together and against the frame member. This slot is preferably elongated to allow the bolt to be shifted longitudinally in order to clear any rivets or other projections depending from the under side of the frame member 7.

Referring now to Fig. 4, and particularly Fig. 6, it is to be observed that there is formed on the inner surface of each plate 16, 16 and immediately above the slot 27, an oblique recess 28 inclined forwardly at an angle such that the recess is substantially at right angles to the under surface of the frame member 7. In order to provide this recess, the thickness of the metal is increased slightly throughout the region of the recess, as clearly shown in Fig. 4. The purpose of the recess 28 in each of the plates 16 is to provide for the insertion and retention of a suitable number of thin metal plates or liners 29 which are adapted to fill the space between the base of the recess and the under side of the frame member 7. Coöperating with the recesses 28 and the liners 29, is a plate or strap 30 which bears flatwise against the upper surface of the frame member 7 and located substantially in alinement with the recesses 28. As clearly shown in Fig. 6, bolts 31, 31 pass through the ends of the plate 30 and extend downwardly and in a rearwardly inclined direction, their lower ends passing through ears 32, 32 formed integral with the plates 16, 16 immediately above the entrances of the recesses 28, 28. The lower ends of the bolts 31, 31 are surmounted by nuts 33, 33 which may be tightened, thereby drawing the lugs 32, 32 and the plate 30 toward each other, the force thus exerted tending to rotate the plates about the pivot bolt in a counter-clockwise direction, which movement is opposed by the presence of the liners 29. The result is obviously a tightening of the parts and the elimination of any play or lost motion in a vertical direction. Furthermore, differences in the vertical dimension of the frame member can be provided for by the addition or removal of liners and the tightening of the bolts 31. In the same way, the vertical position of the cylinder may be maintained by slight adjustment provided by this arrangement of liners and associated adjusting bolts and plate 30.

The entire device as constructed may be easily applied to the end of a frame member, such application being accomplished entirely by clamping action and without the drilling or cutting away of the frame member and parts connected therewith. In the actual application of the bumper it is contemplated that the only alteration that would ordinarily be necessary is the shortening of the lugs 20 and 23 in order to obtain the proper spacing between the plates 15 and 16 in order to assure sufficient amount of pressure being exerted by said lugs against the pivot bolt nuts.

Having described the construction embodying my invention, I claim as new and novel:

1. In a bumper, the combination of an impact bar and a supporting member therefor, comprising pairs of companion plates adapted to be clamped together on opposite sides of the end of a vehicle frame member, each pair of plates being adjustably connected together and bearing at opposite points against a pivot bolt passing through the end of said frame member.

2. In a bumper, the combination of an impact bar and means for attaching said bar to a vehicle frame, comprising pairs of companion plates clamped together on opposite sides of the end of the vehicle frame member, each pair of plates being adjustably connected together on opposite sides of a pivot bolt passing through the end of said frame member, and having bearing engagement therewith at diametrically opposed points.

3. In a bumper, the combination of an impact bar, a supporting member located forwardly of the end of a vehicle frame member, and attaching members comprising pairs of companion plates adapted to be clamped on opposite sides of the end of said vehicle frame member, each pair consisting of plates disposed on opposite sides of a pivot bolt passing through the end of the frame member and bolted together, each of said plates having a lug adapted to bear at diametrically opposite points of said pivot bolt.

4. In a bumper, the combination of an impact bar, and attaching members therefor comprising pairs of companion plates adapted to be clamped on opposite sides of the end of said vehicle frame member, one pair consisting of plates disposed forwardly and rearwardly of a pivot bolt passing through the end of the frame member and bolted together above and below said pivot bolt, each of said plates having a lug adapted to bear on opposite sides of said pivot bolt.

5. In a bumper, the combination of an impact bar, a supporting member located forwardly of the end of a vehicle frame member, and attaching members comprising pairs of companion plates adapted to be clamped on opposite sides of the end of said vehicle frame member, each pair of said plates being spaced apart on opposite sides of a pivot bolt passing through the end of said frame member, and provided with lugs adapted to bear against said pivot bolt at diametrically opposed points, and bolts connecting the plates of each pair and arranged on opposite sides of their respective lugs.

6. In a bumper, the combination of an impact bar and a bracket connecting said impact bar to the end of a vehicle frame member, comprising pairs of companion plates adapted to be clamped against opposite sides of said frame member, the plates of each pair being spaced apart on opposite sides of a pivot bolt passing through the end of said frame member and bolted together above and below said pivot bolt, said plates being provided with integral lugs adapted to bear at diametrically opposite points against said pivot bolt.

7. In a bumper, the combination of an impact bar and a bracket connecting said impact bar to the end of a vehicle frame member, comprising pairs of companion plates adapted to be clamped together on opposite sides of said frame member and the plates of each pair being bolted together on opposite sides of a pivot bolt passing through the end of said frame member, and provided in their opposed margins with substantially semi-circular portions adapted to be arranged in concentric relation to said pivot bolt, and lugs extending radially from said semi-circular portions and bearing endwise against said pivot bolt.

8. In a bumper, the combination of an impact member and means for attaching the same to the end of a vehicle frame member, comprising companion plates adapted to be clamped against opposite sides of said frame member, said plates being formed to provide a substantially annular opening adapted to be located in concentric relation with a pivot bolt extending through the end of said frame member, bearing members projecting radially from the opening in said plates, and means for drawing said bearing members against opposite sides of said pivot bolt.

9. In a bumper, the combination of an impact member and means for attaching the same to the end of a vehicle frame member comprising a pair of plates adapted to be clamped together on opposite sides of said frame member, substantially vertically arranged recesses formed in said plates rearwardly of said pivot bolt, liners adapted to be retained in said recess and to bear against one face of said frame members, and a member adjustably connected with said plates and engaging the opposite face of said frame member for drawing said liners tightly against said frame member.

10. In a bumper, the combination of an impact member and means for attaching the same to the end of a vehicle frame member comprising a pair of plates adapted to be clamped together on opposite sides of said frame member, said plates being provided with bearing lugs engaging opposite sides of a pivot bolt extending through the end of the frame member, recesses formed in said plates to receive the ends of liners adapted to engage one face of the frame members rearwardly of said pivot bolt, and a member adjustably connected with said plates and engaging the opposite face of said frame member for drawing said liners tightly against said frame member.

11. In a bumper, the combination of an impact member and means for attaching the same to the end of a vehicle frame member comprising a pair of companion plates adapted to be clamped together on opposite sides of said frame member, said plates being formed to provide a substantially annular opening adapted to be arranged in concentric relation with a pivot bolt extending through the end of said frame member, and lugs projecting radially from the edge of said opening and bearing against said pivot bolt at diametrically opposed points thereof, means for drawing said lugs against said pivot bolt, and means for rotatively adjusting said plates about the axis of said pivot bolt.

12. In a bumper, the combination of an impact bar and means for attaching said bar to a vehicle frame, comprising pairs of companion plates clamped together on opposite sides of the end of the vehicle frame member and adapted for lateral adjustment, each pair of plates being provided with oppositely disposed bearing surfaces adapted to have clamping engagement with a pivot bolt passing through the end of said frame member.

13. In a bumper, the combination of an impact bar and a bracket connecting said impact bar to the end of a vehicle frame member, comprising pairs of companion plates adapted to be clamped together on opposite sides of said frame member and the plates of each pair adjustably connected together on opposite sides of a pivot bolt passing through the end of said frame member, and adapted for clamping engagement with said pivot bolt, and means for locking said plates for rotative movement about said pivot bolt.

14. In a bumper, the combination of an impact bar and a bracket connecting said impact bar to the end of a vehicle frame member, comprising pairs of companion plates adapted to be clamped together on opposite sides of said frame member, the plates of each pair having clamping engagement with a pivot bolt passing through the end of said frame member, recesses formed in corresponding plates of each pair of plates, a liner adapted to bear against one face of said frame member, and to be retained in said recesses, and means for drawing said liner against said frame member.

In witness whereof, I hereunto subscribe my name this 29 day of January, A. D. 1921.

LEROY BAUMGARTL.